(12) United States Patent
Guo et al.

(10) Patent No.: US 12,024,465 B2
(45) Date of Patent: Jul. 2, 2024

(54) GLASS COMPOSITIONS HAVING IMPROVED MECHANICAL DURABILITY AND LOW CHARACTERISTIC TEMPERATURES

(71) Applicant: CORNING INCORPORATED, Corning, NY (US)

(72) Inventors: Xiaoju Guo, Pittsford, NY (US); Peter Joseph Lezzi, Corning, NY (US); Jian Luo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 44 days.

(21) Appl. No.: 17/834,997

(22) Filed: Jun. 8, 2022

(65) Prior Publication Data

US 2022/0396519 A1 Dec. 15, 2022

Related U.S. Application Data

(60) Provisional application No. 63/209,586, filed on Jun. 11, 2021.

(51) Int. Cl.
*B32B 15/04* (2006.01)
*B32B 17/06* (2006.01)
(Continued)

(52) U.S. Cl.
CPC .............. *C03C 3/097* (2013.01); *C03C 3/085* (2013.01); *C03C 4/18* (2013.01); *C03C 21/002* (2013.01); *C03C 2204/00* (2013.01)

(58) Field of Classification Search
CPC .................................................... C03C 21/002
(Continued)

(56) References Cited

U.S. PATENT DOCUMENTS 9,139,469 B2 * 9/2015 Comte .................... C03C 3/087
9,714,188 B2 * 7/2017 Fu .......................... C03C 21/002
(Continued)

FOREIGN PATENT DOCUMENTS

CN 102971266 B 5/2016
CN 106517770 A 3/2017
(Continued)

OTHER PUBLICATIONS

International Search Report and Written Opinion of the International Searching Authority; PCT/US2022/032813; dated Sep. 26, 2022, 12 pages; European Patent Office.
(Continued)

*Primary Examiner* — Lauren R Colgan
(74) *Attorney, Agent, or Firm* — John P. McGroarty (57) ABSTRACT

A glass composition includes: greater than or equal to 55 mol % and less than or equal to 70 mol % $SiO_2$; greater than or equal to 14 mol % and less than or equal to 25 mol % $Al_2O_3$; greater than or equal to 0 mol % $B_2O_3$; greater than or equal to 0 mol % $P_2O_5$; greater than or equal to 0 mol % and less than or equal to 10 mol % $Li_2O$; greater than or equal to 6.5 mol % and less than or equal to 20 mol % $Na_2O$; greater than or equal to 0 mol % $K_2O$; greater than or equal to 0.1 mol % and less than or equal to 4.5 mol % MgO; greater than or equal to 0 mol % CaO; and greater than or equal to 0 mol % SrO. The sum of $Li_2O$, $Na_2O$, and $K_2O$ in the glass composition may be greater than or equal to 6.5 mol % and less than or equal to 22 mol %. The glass composition may satisfy the relationship $Al_2O_3*(2.94)+B_2O_3*(-0.58)+P_2O_5*(-3.87)+Li_2O*(5.01)+Na_2O*(1.89)+K_2O*(-2.03)$ is greater than 100.

18 Claims, 2 Drawing Sheets

(51) Int. Cl.
*C03C 3/085* (2006.01)
*C03C 3/097* (2006.01)
*C03C 4/18* (2006.01)
*C03C 21/00* (2006.01)

(58) Field of Classification Search
USPC .................................................. 428/426, 410
See application file for complete search history.

(56) References Cited

U.S. PATENT DOCUMENTS

| | | | |
|---|---|---|---|
| 10,150,691 B2* | 12/2018 | Comte | C03C 3/085 |
| 10,315,949 B2 | 6/2019 | Gross et al. | |
| 11,667,566 B2* | 6/2023 | Gross | C03C 21/002 |
| | | | 428/410 |
| 2011/0294649 A1* | 12/2011 | Gomez | C03C 3/091 |
| | | | 501/53 |
| 2014/0023865 A1* | 1/2014 | Comte | C03C 3/083 |
| | | | 501/63 |
| 2014/0308525 A1 | 10/2014 | Hochrein et al. | |
| 2015/0004390 A1* | 1/2015 | Kawamoto | C03C 21/002 |
| | | | 428/220 |
| 2015/0064473 A1* | 3/2015 | Dejneka | C03C 21/002 |
| | | | 501/63 |
| 2015/0147575 A1* | 5/2015 | Dejneka | C03C 3/097 |
| | | | 501/63 |
| 2016/0376186 A1* | 12/2016 | Gross | B32B 27/365 |
| | | | 361/679.26 |
| 2016/0376187 A1* | 12/2016 | Gross | C03C 21/002 |
| | | | 361/679.01 |
| 2017/0197869 A1* | 7/2017 | Beall | C03C 3/097 |
| 2017/0320769 A1* | 11/2017 | Guo | C03C 4/18 |
| 2017/0341973 A1* | 11/2017 | Gross | C03C 3/097 |
| 2018/0127304 A1* | 5/2018 | Gross | H05K 5/03 |
| 2019/0062203 A1* | 2/2019 | Gross | H05K 5/03 |
| 2019/0161386 A1* | 5/2019 | Gross | C03C 3/097 |
| 2019/0375679 A1* | 12/2019 | Gross | C03C 21/002 |
| 2019/0382302 A1 | 12/2019 | Xue et al. | |
| 2020/0307164 A1 | 10/2020 | Gross et al. | |
| 2021/0147280 A1* | 5/2021 | Guo | H05K 5/03 |

FOREIGN PATENT DOCUMENTS

| | | |
|---|---|---|
| CN | 109694187 A | 4/2019 |
| JP | 5546058 B2 | 7/2014 |
| WO | 2019/230889 A1 | 12/2019 |
| WO | 2020/011171 A1 | 1/2020 |
| WO | 2020/021933 A1 | 1/2020 |
| WO | 2020/138062 A1 | 7/2020 |
| WO | 2020/177271 A1 | 9/2020 |
| WO | 2021/068423 A1 | 4/2021 |
| WO | 2021/068424 A1 | 4/2021 |

OTHER PUBLICATIONS

"Reddy, K. P. R. et al, "Fracture Toughness Measurement of Glass and Ceramic Materials Using Chevron-Notched Specimens," J. Am. Ceram. Soc., 71 [6], C-310-C-313 (1988)".
ASTM C1351M—96(2017) "Standard Test Method for Measurement of Viscosity of Glass Between 104 Pas and 108 Pas by Viscous Compression of a Solid Right Cylinder".
ASTM C829-81 (2015), titled "Standard Practice for Measurement of Liquidus Temperature of Glass by the Gradient Furnace Method".
ASTM C965-96 (2012), titled "Standard Practice for Measuring Viscosity of Glass Above the Softening Point".
ASTM standard C770-16, entitled "Standard Test Method for Measurement of Glass Stress-Optical Coefficient,".
Bubsey, R.T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992).

* cited by examiner

GLASS COMPOSITIONS HAVING IMPROVED MECHANICAL DURABILITY AND LOW CHARACTERISTIC TEMPERATURES

This application claims the benefit of priority under 35 U.S.C. § 119 of U.S. Provisional Application Ser. No. 63/209,586 filed on Jun. 11, 2021, the content of which is relied upon and incorporated herein by reference in its entirety.

BACKGROUND

Field

The present specification generally relates to ion-exchangeable glass compositions and, more specifically, to ion-exchangeable alkali aluminosilicate glass compositions having improved mechanical durability and low characteristic temperatures.

TECHNICAL BACKGROUND

The mobile nature of portable devices, such as smart phones, tablets, portable media players, personal computers, and cameras, makes these devices particularly vulnerable to accidental dropping on hard surfaces. These devices typically incorporate cover glasses, which may become damaged upon impact with hard surfaces. In many of these devices, the cover glasses function as display covers, and may incorporate touch functionality, such that use of the devices is negatively impacted when the cover glasses are damaged.

As the adoption of glass in various portable devices has increased, so too has the need to provide glass compositions capable of being formed or shaped into complex geometries. However, the properties of glass which make it a desirable material for certain applications may also hamper the ability to form the glass into complex, 3-dimensional shapes.

Accordingly, a need exists for alternative glass compositions which are mechanically durable and may be readily formed into 3-dimensional shapes.

SUMMARY

According to a first aspect A1, a glass composition may comprise: greater than or equal to 55 mol % and less than or equal to 70 mol % $SiO_2$; greater than or equal to 14 mol % and less than or equal to 25 mol % $Al_2O_3$; greater than or equal to 0 mol % $B_2O_3$; greater than or equal to 0 mol % $P_2O_5$; greater than or equal to 0 mol % and less than or equal to 10 mol % $Li_2O$; greater than or equal to 6.5 mol % and less than or equal to 20 mol % $Na_2O$; greater than or equal to 0 mol % $K_2O$; greater than or equal to 0.1 mol % and less than or equal to 4.5 mol % MgO; greater than or equal to 0 mol % CaO; and greater than or equal to 0 mol % SrO, wherein: $Li_2O+Na_2O+K_2O$ is greater than or equal to 6.5 mol % and less than or equal to 22 mol %; and $Al_2O_3*(2.94)+B_2O_3*(-0.58)+P_2O_5*(-3.87)+Li_2O*(5.01)+Na_2O*(1.89)+K_2O*(-2.03)$ is greater than 100.

A second aspect A2 includes the glass composition according to the first aspect A1, wherein $Al_2O_3*(4.20)+B_2O_3*(-7.69)+P_2O_5*(-1.61)+Li_2O*(-9.66)+Na_2O*(-7.11)+K_2O*(-9.78)+MgO*(-4.03)+CaO*(-6.14)+SrO*(-2.41)$ is less than −100.

A third aspect A3 includes the glass composition according to the first aspect A1 or the second aspect A2, wherein $Al_2O_3*(-7.17)+B_2O_3*(6.89)+P_2O_5*(12.72)+Li_2O*(4.07)+Na_2O*(-3.47)+K_2O*(-4.01)+MgO*(2.50)+CaO*(3.55)+SrO*(-0.77)$ is greater than −100.

A fourth aspect A4 includes the glass composition according to any of the first through third aspects A1-A3, wherein $Al_2O_3*(26.051)+B_2O_3*(24.853)+P_2O_5*(-33.097)+Li_2O*(-7.539)+Na_2O*(-17.349)+K_2O*(-33.097)+MgO*(5.192)+CaO*(-10.867)+SrO*(-10.867)$ is greater than 100.

A fifth aspect A5 includes the glass composition according to any of the first through fourth aspects A1-A4, wherein $Li_2O+Na_2O+K_2O$ is greater than or equal to 6.5 mol % and less than or equal to 20 mol %.

A sixth aspect A6 includes the glass composition according to any of the first through fifth aspects A1-A5, wherein the glass composition comprises greater than or equal to 14 mol % and less than or equal to 20 mol % $Al_2O_3$.

A seventh aspect A7 includes the glass composition according to any of the first through sixth aspects A1-A6, wherein the glass composition comprises greater than or equal to 0.5 mol % and less than or equal 4 mol % MgO.

An eighth aspect A8 includes the glass composition according to any of the first through seventh aspects A1-A7, wherein the glass composition comprises greater than or equal to 3 mol % and less than or equal to 10 mol % $Li_2O$.

A ninth aspect A9 includes the glass composition according to any of the first through eighth aspects A1-A8, wherein the glass composition comprises greater than or equal to 6.5 mol % and less than or equal to 15 mol % $Na_2O$.

A tenth aspect A10 includes the glass composition according to any of the first through ninth aspects A1-A9, wherein the glass composition comprises greater than or equal to 0 mol % and less than or equal to 5 mol % $B_2O_3$.

An eleventh aspect A11 includes the glass composition according to any of the first through tenth aspects A1-A10, wherein the glass composition comprises greater than or equal to 0 mol % and less than or equal to 5 mol % $P_2O_5$.

A twelfth aspect A12 includes the glass composition according to any of the first through eleventh aspects A1-A11, wherein the glass composition comprises greater than or equal to 56 mol % and less than or equal to 67 mol % $SiO_2$.

A thirteenth aspect A13 includes the glass composition according to any of the first through twelfth aspects A1-A12, wherein the glass composition has a softening point greater than or equal to 700° C. and less than or equal to 860° C.

A fourteenth aspect A14 includes the glass composition according to the thirteenth aspect A13, wherein the glass composition has a softening point greater than or equal to 750° C. and less than or equal to 840° C.

A fifteenth aspect A15 includes the glass composition according to any of the first through fourteenth aspects A1-A14, wherein the glass composition is chemically strengthened and has a surface compressive stress greater than or equal to 1100 MPa.

A sixteenth aspect A16 includes the glass composition according to the fifteenth aspect A15, wherein the glass composition is chemically strengthened in an ion exchange bath comprising $KNO_3$ at a temperature greater than or equal to 350° C. and less than or equal to 500° C. for a time period greater than or equal to 2 hours and less than or equal to 12 hours.

A seventeenth aspect A17 includes the glass composition according to the fifteenth aspect A15 or sixteenth aspect A16, wherein the strengthened glass has a surface compressive stress greater than or equal to 1150 MPa.

A eighteenth aspect A18 includes the glass composition according to any of the fifteenth through seventeenth aspects A15-A17, wherein the strengthened glass has a depth of compression of greater than or equal to 4.5 μm.

A nineteenth aspect A19 includes the glass composition according to the eighteenth aspect A18, wherein the strengthened glass has a depth of compression greater than or equal to 6 μm.

An twentieth aspect A20 includes the glass composition according to the fifteenth aspect A15 or the sixteenth aspect A16, wherein the strengthened glass has a surface compressive stress greater than or equal to 1100 MPa and a depth of compression greater than or equal to 4.5 μm.

Additional features and advantages of the glass compositions described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of ion-exchangeable alkali aluminosilicate glass compositions with improved mechanical durability and low characteristic temperatures. According to embodiments, a glass composition includes: greater than or equal to 55 mol % and less than or equal to 70 mol % $SiO_2$; greater than or equal to 14 mol % and less than or equal to 25 mol % $Al_2O_3$; greater than or equal to 0 mol % $B_2O_3$; greater than or equal to 0 mol % $P_2O_5$; greater than or equal to 0 mol % and less than or equal to 10 mol % $Li_2O$; greater than or equal to 6.5 mol % and less than or equal to 20 mol % $Na_2O$; greater than or equal to 0 mol % $K_2O$; greater than or equal to 0.1 mol % and less than or equal to 4.5 mol % MgO; greater than or equal to 0 mol % CaO; and greater than or equal to 0 mol % SrO. The sum of $Li_2O$, $Na_2O$, and $K_2O$ in the glass composition may be greater than or equal to 6.5 mol % and less than or equal to 22 mol %. The glass composition may satisfy the relationship $Al_2O_3*(2.94)+B_2O_3*(-0.58)+P_2O_5*(-3.87)+Li_2O*(5.01)+Na_2O*(1.89)+K_2O*(-2.03)$ is greater than 100. Various embodiments of ion-exchangeable glass compositions having improved mechanical durability and low characteristic temperatures and methods of making such glass compositions will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The terms "0 mol %," "free," and "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.05 mol %.

In the embodiments of the glass compositions described herein, the concentrations of constituent components (e.g., $SiO_2$, $Al_2O_3$, and the like) are specified in mole percent (mol %) on an oxide basis, unless otherwise specified.

Viscosity of the glass compositions described herein is measured according to ASTM C965-96.

The term "melting point," as used herein, refers to the temperature at which the viscosity of the glass composition is 200 poise.

The term "softening point," as used herein, refers to the temperature at which the viscosity of the glass composition is $1\times10^{7.6}$ poise. The softening point is measured according to the parallel plate viscosity method which measures the viscosity of inorganic glass from $10^7$ to $10^9$ poise as a function of temperature, similar to ASTM C1351M.

The term "annealing point," as used herein, refers to the temperature at which the viscosity of the glass composition is $1\times10^{13.18}$ poise.

The term "strain point," as used herein, refers to the temperature at which the viscosity of the glass composition is $1\times10^{14.68}$ poise.

The term "molding temperature" as used herein, refers to the temperature at which the viscosity of the glass is $1 \times 10^{8.8}$ poise.

The term "CTE," as used herein, refers to the coefficient of thermal expansion of the glass composition over a temperature range from about 20° C. to about 300° C., unless otherwise specified.

The term "liquidus viscosity," as used herein, refers to the viscosity of the glass composition at the onset of devitrification (i.e., at the liquidus temperature as determined with the gradient furnace method according to ASTM C829-81).

The term "liquidus temperature," as used herein, refers to the temperature at which the glass composition begins to devitrify.

The term "fracture toughness," as used herein, refers to the $K_{Ic}$ value, and is measured by the chevron notched short bar method. The chevron notched short bar (CNSB) method is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that $Y^*_m$ is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992).

Surface compressive stress is measured with a surface stress meter (FSM) such as commercially available instruments such as the FSM-6000, manufactured by Orihara Industrial Co., Ltd. (Japan). Surface stress measurements rely upon the measurement of the stress optical coefficient (SOC), which is related to the birefringence of the glass-ceramic. SOC, in turn, is measured according to Procedure C (Glass Disc Method) described in ASTM standard C770-16, entitled "Standard Test Method for Measurement of Glass Stress-Optical Coefficient," the contents of which are incorporated herein by reference in their entirety. Depth of compression (DOC) is also measured with the FSM.

The phrase "depth of compression" (DOC), as used herein, refers to the position in the article where surface compressive stress transitions to tensile stress.

When an electronic device is dropped on a hard surface, a preexisting flaw in a cover glass of the electronic device may be a failure origination point and the cover glass may fail from that point due to over stress. To prevent the propagation of flaws throughout the cover glass, chemical strengthening processes may be used to impart high surface compressive stress in the cover glass. The compressive stresses may extend below the surface of the glass to a depth of compression. Compressive stresses at or within the surface of the glass may maintain the tip of a flaw in compression thereby mitigating cover glass breakage.

In addition to having high surface compressive stress capability, it is important for glass compositions to have the ability to be formed into complex, 3-dimensional shapes that may be employed as cover glasses for electronic devices or optical components (e.g., lenses, cones, or the like) that may be incorporated into electronic devices. As such, it is desirable that glass compositions have a relatively low softening point (and other relatively low characteristic temperatures such as the strain point, annealing point, and molding point) to facilitate forming of the glass article.

However, glass compositions with a relative low softening point (i.e., glasses which may be readily formed) may have more stress relaxation during ion exchange, which makes it difficult to obtain a high surface compressive stress.

Disclosed herein are glass compositions which mitigate the aforementioned problems. Specifically, the glass compositions disclosed herein comprise a balance of various glass components that results in ion-exchangeable glass compositions with high surface compressive stress capability and relatively low characteristic temperatures (i.e., softening point, strain point, annealing point, and molding point) such that the glass compositions may be formed into 3-dimensional shapes.

The glass compositions described herein may be described as aluminosilicate glass compositions and comprise $SiO_2$, $Al_2O_3$, and MgO. In addition to $SiO_2$, $Al_2O_3$, and MgO, the glass compositions described herein also include alkali oxides, such as $Li_2O$ and $Na_2O$, to enable the ion-exchangeability of the glass compositions.

$SiO_2$ is the primary glass former in the glass compositions described herein and may function to stabilize the network structure of the glass compositions. The concentration of $SiO_2$ in the glass compositions should be sufficiently high (e.g., greater than or equal to 55 mol %) to enhance the chemical durability of the glass composition and, in particular, the resistance of the glass composition to degradation upon exposure to acidic solutions, basic solutions, and in water. The amount of $SiO_2$ may be limited (e.g., to less than or equal to 70 mol %) to control the melting point of the glass composition, as the melting temperature of pure $SiO_2$ or high-$SiO_2$ glasses is undesirably high. Thus, limiting the concentration of $SiO_2$ may aid in improving the meltability and the formability of the glass composition.

Accordingly, in embodiments, the glass composition may comprise greater than or equal to 55 mol % and less than or equal to 70 mol % $SiO_2$. In embodiments, the glass composition may comprise greater than or equal to 56 mol % and less than or equal to 67 mol % $SiO_2$. In embodiments, the concentration of $SiO_2$ in the glass composition may be greater than or equal to 55 mol %, greater than or equal to 56 mol %, greater than or equal to 57 mol %, or even greater than or equal to 58 mol %. In embodiments, the concentration of $SiO_2$ in the glass composition may be less than or equal to 70 mol %, less than or equal to 67 mol %, less than or equal to 65 mol %, less than or equal to 63 mol %, or even less than or equal to 60 mol %. In embodiments, the concentration of $SiO_2$ in the glass composition may be greater than or equal to 55 mol % and less than or equal to 70 mol %, greater than or equal to 55 mol % and less than or equal to 67 mol %, greater than or equal to 55 mol % and less than or equal to 65 mol %, greater than or equal to 55 mol % and less than or equal to 63 mol %, greater than or equal to 55 mol % and less than or equal to 60 mol %, greater than or equal to 56 mol % and less than or equal to 70 mol %, greater than or equal to 56 mol % and less than or equal to 67 mol %, greater than or equal to 56 mol % and less than or equal to 65 mol %, greater than or equal to 56 mol % and less than or equal to 63 mol %, greater than or equal to 56 mol % and less than or equal to 60 mol %, greater than or equal to 57 mol % and less than or equal to 70 mol %, greater than or equal to 57 mol % and less than or equal to 67 mol %, greater than or equal to 57 mol % and less than or equal to 65 mol %, greater than or equal to 57 mol % and less than or equal to 63 mol %, greater than or equal to 57 mol % and less than or equal to 60 mol %, greater than or equal to 58 mol % and less than or equal to 70 mol %, greater than or equal to 58 mol % and less than or equal to 67 mol %, greater than or equal to 58 mol % and less than or equal to 65 mol %, greater than or equal to 58 mol % and less than or equal to 63 mol %, or even greater than or equal to 58 mol % and less than or equal to 60 mol %, or any and all sub-ranges formed from any of these endpoints.

Like $SiO_2$, $Al_2O_3$ may also stabilize the glass network and additionally provides improved mechanical properties and chemical durability to the glass composition. The amount of $Al_2O_3$ may also be tailored to control the liquidus viscosity of the glass composition. The concentration of $Al_2O_3$ should be sufficiently high (e.g., greater than or equal to 14 mol %) to, in conjunction with alkali oxides present in the glass compositions, improve the susceptibility of the glass to ion exchange strengthening. However, if the amount of $Al_2O_3$ is too high (e.g., greater than 25 mol %), the liquidus viscosity may increase and diminish the formability of the glass composition.

Accordingly, in embodiments, the glass composition may comprise greater than or equal to 14 mol % and less than or equal to 25 mol % $Al_2O_3$. In embodiments, the glass composition may comprise greater than or equal to 14 mol % and less than or equal to 20 mol % $Al_2O_3$. In embodiments, the concentration of $Al_2O_3$ in the glass composition may be greater than or equal to 14 mol %, greater than or equal to 15 mol %, or even greater than or equal to 16 mol %. In embodiments, the concentration of $Al_2O_3$ in the glass composition may be less than or equal to 25 mol %, less than or equal to 20 mol %, or even less than or equal to 18 mol %. In embodiments, the concentration of $Al_2O_3$ in the glass composition may be greater than or equal to 14 mol % and less than or equal to 25 mol %, greater than or equal to 14 mol % and less than or equal to 20 mol %, greater than or equal to 14 mol % and less than or equal to 18 mol %, greater than or equal to 15 mol % and less than or equal to 25 mol %, greater than or equal to 15 mol % and less than or equal to 20 mol %, greater than or equal to 15 mol % and less than or equal to 18 mol %, greater than or equal to 16 mol % and less than or equal to 25 mol %, greater than or equal to 16 mol % and less than or equal to 20 mol %, or even greater than or equal to 16 mol % and less than or equal to 18 mol %, or any and all sub-ranges formed from any of these endpoints.

MgO lowers the liquidus viscosity of the glass compositions, which enhances the formability, the strain point, and the Young's modulus, and may improve the ion exchangeability. However, when too much MgO is added to the glass composition (e.g., greater than 4.5 mol % MgO), there is a significant decrease in the diffusivity of sodium and potassium ions in the glass composition which, in turn, adversely impacts the ion exchange performance of the resultant glass.

In embodiments, the glass composition may comprise greater than or equal to 0.1 mol % and less than or equal to 4.5 mol % MgO. In embodiments, the glass composition may comprise greater than or equal to 0.5 mol % and less than or equal to 4 mol % MgO. In embodiments, the concentration of MgO in the glass composition may be greater than or equal to 0.1 mol %, greater than or equal to 0.5 mol %, or even greater than or equal to 1 mol %. In embodiments, the concertation of MgO in the glass composition may be less than or equal 4.5 mol %, less than or equal to 4 mol %, or even less than or equal to 3.5 mol %. In embodiments, the concentration of MgO in the glass composition may be greater than or equal to 0.1 mol % and less than or equal to 4.5 mol %, greater than or equal to 0.1 mol % and less than or equal to 4 mol %, greater than or equal to 0.1 mol % and less than or equal to 3.5 mol %, greater than or equal to 0.5 mol % and less than or equal to 4.5 mol %, greater than or equal to 0.5 mol % and less than or equal to 4 mol %, greater than or equal to 0.5 mol % and less than or equal to 3.5 mol %, greater than or equal to 1 mol % and less than or equal to 4.5 mol %, greater than or equal to 1 mol % and less than or equal to 4 mol %, or even greater than or equal to 1 mol % and less than or equal to 3.5 mol %, or any and all sub-ranges formed from any of these endpoints.

As described hereinabove, the glass compositions may contain alkali oxides, such as $Li_2O$ and $Na_2O$, to enable the ion-exchangeability of the glass compositions. $Li_2O$ aids in the ion exchangeability of the glass composition and also reduces the softening point of the glass composition, thereby increasing the formability of the glass. However, if too much $Li_2O$ is added (e.g., greater than 10 mol %), the liquidus viscosity and annealing point may be too low, which causes extensive stress relaxation.

In embodiments, the glass composition may comprise greater than or equal to 0 mol % and less than or equal to 10 mol % $Li_2O$. In embodiments, the glass composition may comprise greater than or equal to 3 mol % and less than or equal to 10 mol % $Li_2O$. In embodiments, the concentration of $Li_2O$ in the glass composition may be greater than or equal to 0 mol %, greater than or equal to 3 mol %, greater than or equal to 5 mol %, or even greater than or equal to 7 mol %. In embodiments, the concentration of $Li_2O$ in the glass composition may be less than or equal to 10 mol %, less than or equal to 9 mol %, or even less than or equal to 8 mol %. In embodiments, the concentration of $Li_2O$ in the glass composition may be greater than or equal to 0 mol % and less than or equal to 10 mol %, greater than or equal to 0 mol % and less than or equal to 9 mol %, greater than or equal to 0 mol % and less than or equal to 8 mol %, greater than or equal to 3 mol % and less than or equal to 10 mol %, greater than or equal to 3 mol % and less than or equal to 9 mol %, greater than or equal to 3 mol % and less than or equal to 8 mol %, greater than or equal to 5 mol % and less than or equal to 10 mol %, greater than or equal to 5 mol % and less than or equal to 9 mol %, greater than or equal to 5 mol % and less than or equal to 8 mol %, greater than or equal to 7 mol % and less than or equal to 10 mol %, greater than or equal to 7 mol % and less than or equal to 9 mol %, or even greater than or equal to 7 mol % and less than or equal to 8 mol %, or any and all sub-ranges formed from any of these endpoints.

In addition to aiding in ion exchangeability of the glass composition, $Na_2O$ decreases the melting point and improves formability of the glass composition. The concentration of $Na_2O$ in the glass composition should be sufficiently high (e.g., greater than or equal to 6.5 mol %) to decrease the liquidus viscosity of the glass composition. However, if too much $Na_2O$ (e.g., greater than 20 mol %) is added to the glass composition, the annealing point may be too low causing excessive stress relaxation. When the extra $Na_2O$ is bonded to non-bridging oxygen, it may slow down diffusivity.

In embodiments, the glass composition may comprise greater than or equal to 6.5 mol % and less than or equal to 20 mol % $Na_2O$. In embodiments, the glass composition may comprise greater than or equal to 6.5 mol % and less than or equal to 15 mol % $Na_2O$. In embodiments, the concentration of $Na_2O$ in the glass composition may be greater than or equal to 6.5 mol %, greater than or equal to 7.5 mol %, greater than or equal to 8.5 mol %, greater than or equal to 9.5 mol %, or even greater than or equal to 10.5 mol %. In embodiments, the concentration of $Na_2O$ in the glass composition may be less than or equal to 20 mol %, less than or equal to 15 mol %, or even less than or equal to 12 mol %. In embodiments, the concentration of $Na_2O$ in the glass composition may be greater than or equal to 6.5 mol % and less than or equal to 20 mol %, greater than or equal to 6.5 mol % and less than or equal to 15 mol %, greater than or equal to 6.5 mol % and less than or equal to 12 mol %, greater than or equal to 7.5 mol % and less than or equal to 20 mol %, greater than or equal to 7.5 mol % and less than or equal to 15 mol %, greater than or equal to 7.5 mol % and less than or equal to 12 mol %, greater than or equal to 8.5 mol % and less than or equal to 20 mol %, greater than or equal to 8.5 mol % and less than or equal to 15 mol %, greater than or equal to 8.5 mol % and less than or equal to 12 mol %, greater than or equal to 9.5 mol % and less than or equal to 20 mol %, greater than or equal to 9.5 mol % and less than or equal to 15 mol %, greater than or equal to 9.5 mol % and less than or equal to 12 mol %, greater than or equal to 10.5 mol % and less than or equal to 20 mol %, greater than or equal to 10.5 mol % and less than or equal to 15 mol %, or even greater than or equal to 10.5 mol % and less than or equal to 12 mol %, or any and all sub-ranges formed from any of these endpoints.

The glass compositions described herein may further comprise alkali metal oxides other than $Li_2O$ and $Na_2O$, such as $K_2O$. $K_2O$ promotes ion exchange and increases the depth of compression. However, adding $K_2O$ may cause the surface compressive stress to be too low.

In embodiments, the concentration of $K_2O$ in the glass composition may be greater than or equal to 0 mol % or even greater than or equal to 0.1 mol %. In embodiments, the concentration of $K_2O$ in the glass composition may be less than or equal to 5 mol %, less than or equal to 3 mol %, less than or equal to 1 mol %, or even less than or equal to 0.5 mol %. In embodiments, the concentration of $K_2O$ in the glass composition may be greater than or equal to 0 mol % and less than or equal to 5 mol %, greater than or equal to 0.1 mol % and less than or equal to 5 mol %, greater than or equal to 0 mol % and less than or equal to 3 mol %, greater than or equal to 0.1 mol % and less than or equal to 3 mol %, greater than or equal to 0 mol % and less than or equal to 1 mol %, greater than or equal to 0.1 mol % and less than or equal to 1 mol %, greater than or equal to 0 mol % and less than or equal to 0.5 mol %, or even greater than or equal to 0.1 mol % and less than or equal to 0.5 mol %, or any and all sub-ranges formed from any of these endpoints.

The sum of all alkali oxides is expressed herein as $R_2O$. Specifically, $R_2O$ is the sum (in mol %) of $Li_2O$, $Na_2O$, and $K_2O$ present in the glass composition. The alkali oxides aid in decreasing the softening point and molding temperature of the glass composition, thereby offsetting the increase in the softening point and molding temperature of the glass composition due to higher amounts of $SiO_2$ in the glass composition. The decrease in the softening point and molding temperature may be further enhanced by including combinations of alkali oxides (e.g., two or more alkali oxides) in the glass composition, a phenomenon referred to as the "mixed alkali effect." However, it has been found that if the amount of alkali oxide is too high, the annealing point of the glass composition may be too low, which may be undesirable. Moreover, an excess concentration of $R_2O$ in the glass composition (e.g., greater than 22 mol %), which is not charge balanced by $Al_2O_3$, reduces diffusivity and promotes stress relaxation.

In embodiments, the concentration of $R_2O$ in the glass composition may be greater than or equal to 6.5 mol % and less than or equal to 22 mol %. In embodiments, the concentration of $R_2O$ in the glass composition may be greater than or equal to 6.5 mol % and less than or equal to 20 mol %. In embodiments, the concentration of $R_2O$ in the glass composition may be greater than or equal to 6.5 mol %, greater than or equal to 8.5 mol %, greater than or equal to 10.5 mol %, greater than or equal to 12.5 mol %, greater than or equal to 14.5 mol %, or even greater than or equal to 16.5 mol %. In embodiments, the concentration of $R_2O$ in the glass composition may be less than or equal to 22 mol %, less than or equal to 20 mol %, or even less than or equal to 19 mol %. In embodiments, the concentration of $R_2O$ in the glass composition may be greater than or equal to 6.5 mol % and less than or equal to 22 mol %, greater than or equal to 6.5 mol % and less than or equal to 20 mol %, greater than or equal to 6.5 mol % and less than or equal to 19 mol %, greater than or equal to 8.5 mol % and less than or equal to 22 mol %, greater than or equal to 8.5 mol % and less than or equal to 20 mol %, greater than or equal to 8.5 mol % and less than or equal to 19 mol %, greater than or equal to 10.5 mol % and less than or equal to 22 mol %, greater than or equal to 10.5 mol % and less than or equal to 20 mol %, greater than or equal to 10.5 mol % and less than or equal to 19 mol %, greater than or equal to 12.5 mol % and less than or equal to 22 mol %, greater than or equal to 12.5 mol % and less than or equal to 20 mol %, greater than or equal to 12.5 mol % and less than or equal to 19 mol %, greater than or equal to 14.5 mol % and less than or equal to 22 mol %, greater than or equal to 14.5 mol % and less than or equal to 20 mol %, greater than or equal to 14.5 mol % and less than or equal to 19 mol %, greater than or equal to 16.5 mol % and less than or equal to 22 mol %, greater than or equal to 16.5 mol % and less than or equal to 20 mol %, or even greater than or equal to 16.5 mol % and less than or equal to 19 mol %, or any and all sub-ranges formed from any of these endpoints.

The glass compositions described herein may further comprise $B_2O_3$. $B_2O_3$ may be added to glass compositions to reduce the liquidus viscosity at a given temperature (e.g., the strain, annealing, and softening temperatures) thereby improving the formability of the glass. However, it has been found that additions of $B_2O_3$ significantly decrease the diffusivity of sodium and potassium ions in the glass composition which, in turn, adversely impacts the ion exchange performance of the resultant glass. In particular, it has been found that additions of $B_2O_3$ significantly increase the time required to achieve a given depth of layer relative to glass compositions that are $B_2O_3$ free. Accordingly, in embodiments, the amount of $B_2O_3$ added to the glass composition may be minimized in order to improve the ion exchange performance of the glass composition.

In embodiments, the glass composition may comprise greater than or equal to 0 mol % $B_2O_3$. In embodiments, the glass composition may comprise greater than or equal to 0 mol % and less than or equal to 5 mol % $B_2O_3$. In embodiments, the concentration of $B_2O_3$ in the glass composition may be greater than or equal to 0 mol %, greater than or equal to 1 mol %, greater than or equal to 2 mol %, or even greater than or equal to 3 mol %. In embodiments, the concentration of $B_2O_3$ in the glass composition may be less than or equal to 5 mol % or even less than or equal to 4 mol %. In embodiments, the concentration of $B_2O_3$ in the glass composition may be greater than or equal to 0 mol % and less than or equal to 5 mol %, greater than or equal to 0 mol % and less than or equal to 4 mol %, greater than or equal to 1 mol % and less than or equal to 5 mol %, greater than or equal to 1 mol % and less than or equal to 4 mol %, greater than or equal to 2 mol % and less than or equal to 5 mol %, greater than or equal to 2 mol % and less than or equal to 4 mol %, greater than or equal to 3 mol % and less than or equal to 5 mol %, or even greater than or equal to 3 mol % and less than or equal to 4 mol %, or any and all sub-ranges formed from any of these endpoints. In embodiments, the glass composition may be substantially free or free of $B_2O_3$.

The glass compositions described herein may further comprise $P_2O_5$. Like $SiO_2$ and $Al_2O_3$, $P_2O_5$ may be added to the glass composition as a network former, thereby reducing the meltability and formability of the glass composition. Thus, $P_2O_5$ may be added in amounts that do not overly decrease these properties. The addition of $P_2O_5$ may also increase the diffusivity of ions in the glass composition during ion exchange treatment, thereby increasing the efficiency of these treatments.

In embodiments, the glass composition may comprise greater than or equal to 0 mol % $P_2O_5$. In embodiments, the glass composition may comprise greater than or equal to 0 mol % and less than or equal to 5 mol % $P_2O_5$. In embodiments, the concentration of $P_2O_5$ in the glass composition may be greater than or equal to 0 mol %, greater than or equal to 0.1 mol %, greater than or equal to 0.5 mol %, or even greater than or equal to 1 mol %. In embodiments, the concentration of $P_2O_5$ in the glass composition may be less than or equal to 5 mol %, less than or equal to 4 mol %, less than or equal to 3 mol %, or even less than or equal to 2 mol %. In embodiments, the concentration of $P_2O_5$ in the glass composition may be greater than or equal to 0 mol % and less than or equal to 5 mol %, greater than or equal to 0 mol % and less than or equal to 4 mol %, greater than or equal to 0 mol % and less than or equal to 3 mol %, greater than or equal to 0 mol % and less than or equal to 2 mol %, greater than or equal to 0.1 mol % and less than or equal to 5 mol %, greater than or equal to 0.1 mol % and less than or equal to 4 mol %, greater than or equal to 0.1 mol % and less than or equal to 3 mol %, greater than or equal to 0.1 mol % and less than or equal to 2 mol %, greater than or equal to 0.5 mol % and less than or equal to 5 mol %, greater than or equal to 0.5 mol % and less than or equal to 4 mol %, greater than or equal to 0.5 mol % and less than or equal to 3 mol %, greater than or equal to 0.5 mol % and less than or equal to 2 mol %, greater than or equal to 1 mol % and less than or equal to 5 mol %, greater than or equal to 1 mol % and less than or equal to 4 mol %, greater than or equal to 1 mol % and less than or equal to 3 mol %, or even greater than or equal to 1 mol % and less than or equal to 2 mol %, or any and all sub-ranges formed from any of these endpoints. In embodiments, the glass composition may be substantially free or free of $P_2O_5$.

The glass compositions described herein may further comprise CaO. CaO lowers the viscosity of a glass composition, which enhances the formability, the strain point and the Young's modulus, and may improve the ion exchangeability. However, when too much CaO is added to the glass composition, there is a significant decrease in the diffusivity of sodium and potassium ions in the glass composition which, in turn, adversely impacts the ion exchange performance of the resultant glass.

In embodiments, the concentration of CaO in the glass composition may be greater than or equal to 0 mol %, greater than or equal to 0.1 mol %, greater than or equal to 0.5 mol %, or even greater than or equal to 1 mol %. In embodiments, the concentration of CaO in the glass composition may be less than or equal to 10 mol %, less than or equal to 5 mol %, or even less than or equal to 3 mol %. In embodiments, the concentration of CaO in the glass composition may be greater than or equal to 0 mol % and less than or equal to 10 mol %, greater than or equal to 0.1 mol % and less than or equal to 10 mol %, greater than or equal to 0.5 mol % and less than or equal to 10 mol %, greater than or equal to 1 mol % and less than or equal to 10 mol %, greater than or equal to 0 mol % and less than or equal to 5 mol %, greater than or equal to 0.1 mol % and less than or equal to 5 mol %, greater than or equal to 0.5 mol % and less than or equal to 5 mol %, greater than or equal to 1 mol % and less than or equal to 5 mol %, greater than or equal to 0 mol % and less than or equal to 3 mol %, greater than or equal to 0.1 mol % and less than or equal to 3 mol %, greater than or equal to 0.5 mol % and less than or equal to 3 mol %, or even greater than or equal to 1 mol % and less than or equal to 3 mol %, or any and all sub-ranges formed from any of these endpoints. In embodiments, the glass composition may be substantially free or free of CaO.

In embodiments, the glass compositions described herein may further comprise divalent cation oxides. The sum of all divalent cation oxides is expressed herein as RO. Specifically, RO is the sum (in mol %) of MgO, CaO, SrO, BaO, and ZnO. In embodiments, the concentration of RO in the glass composition may be greater than or equal to 0.1 mol %, greater than or equal to 0.5 mol %, or even greater than or equal to 1 mol %. In embodiments, the concentration of RO in the glass composition may be less than or equal to 10 mol %, less than or equal to 5 mol %, or even less than or equal to 3 mol %. In embodiments, the concentration of RO in the glass composition may be greater than or equal to 0.1 mol % and less than or equal to 10 mol %, greater than or equal to 0.5 mol % and less than or equal to 10 mol %, greater than or equal to 1 mol % and less than or equal to 10 mol %, greater than or equal to 0.1 mol % and less than or equal to 5 mol %, greater than or equal to 0.5 mol % and less than or equal to 5 mol %, greater than or equal to 1 mol % and less than or equal to 5 mol %, greater than or equal to 0.1 mol % and less than or equal to 3 mol %, greater than or equal to 0.5 mol % and less than or equal to 3 mol %, or even greater than or equal to 1 mol % and less than or equal to 3 mol %, or any and all sub-ranges formed from any of these endpoints.

In embodiments, $R_2O$ and RO may be present in the glass composition in excess of $Al_2O_3$ to decrease the softening point of the glass composition while not dramatically negatively impacting diffusivity. In embodiments, the sum of $R_2O$ and RO minus the amount of $Al_2O_3$ (i.e., $R_2O+RO-Al_2O_3$) in the glass composition may be greater than or equal to 1 mol % or even greater than or equal to 3 mol %. In embodiments, $R_2O+RO-Al_2O_3$ in the glass composition may be less than or equal to 10 mol %, less than or equal to 8 mol %, or even less than or equal to 6 mol %. In embodiments, $R_2O+RO-Al_2O_3$ in the glass composition may be greater than or equal to 1 mol % and less than or equal to 10 mol %, greater than or equal to 3 mol % and less than or equal to 10 mol %, greater than or equal to 1 mol % and less than or equal to 8 mol %, greater than or equal to 3 mol % and less than or equal to 8 mol %, greater than or equal to 1 mol % and less than or equal to 6 mol %, or even greater than or equal to 3 mol % and less than or equal to 6 mol %, or any and all sub-ranges formed from any of these endpoints.

The glass compositions described herein may further comprise $TiO_2$. $TiO_2$ suppresses color change of a glass composition when exposed to UV light, which may be used in a finisher process. In embodiments, the concentration of $TiO_2$ in the glass composition may be greater than or equal to 0 mol % and less than or equal to 1 mol %, greater than or equal to 0 mol % and less than or equal 0.5 mol %, or even greater than or equal to 0 mol % and less than or equal to 0.3 mol %.

The glass compositions described herein may further comprise one or more additional metal oxides to further enhance the ion-exchangeability of the glass compositions. For example, the glass composition may further include $ZrO_2$ or $Y_2O_3$, each of which further improves the ion-exchangeability of the glass composition. In embodiments, the additional metal oxide may be present in an amount greater than or equal to 0 mol % and less than or equal 1 mol % or even greater than or equal to 0 mol % and less than or equal to 0.5 mol %.

In embodiments, the glass compositions described herein may further include tramp materials such as MnO, $MoO_3$, $W_3$, $La_2O_3$, CdO, $As_2O_3$, $Sb_2O_3$, sulfur-based compounds, such as sulfates, halogens, or combinations thereof.

The articles formed from the glass compositions described herein may be any suitable thickness, which may vary depending on the particular application for use of the glass composition. Glass sheet embodiments may have a thickness greater than or equal to 30 μm, greater than or equal to 50 μm, greater than or equal to 100 μm, greater than or equal to 250 μm, greater than or equal to 500 μm, greater than or equal to 750 μm, or even greater than or equal to 1 mm. In embodiments, the glass sheet embodiments may have a thickness less than or equal to 6 mm, less than or equal to 5 mm, less than or equal to 4 mm, less than or equal to 3 mm, or even less than or equal to 2 mm. In embodiments, the glass sheet embodiments may have a thickness greater than or equal to 30 μm and less than or equal to 6 mm, greater than or equal to 30 μm and less than or equal to 5 mm, greater than or equal to 30 μm and less than or equal to 4 mm, greater than or equal to 30 μm and less than or equal to 3 mm, greater than or equal to 30 μm and less than or equal to 2 mm, greater than or equal to 50 μm and less than or equal to 6 mm, greater than or equal to 50 μm and less than or equal to 5 mm, greater than or equal to 50 μm and less than or equal to 4 mm, greater than or equal to 50 μm and less than or equal to 3 mm, greater than or equal to 50 μm and less than or equal to 2 mm, greater than or equal to 100 μm and less than or equal to 6 mm, greater than or equal to 100 μm and less than or equal to 5 mm, greater than or equal to 100 μm and less than or equal to 4 mm, greater than or equal to 100 μm and less than or equal to 3 mm, greater than or equal to 100 μm and less than or equal to 2 mm, greater than or equal to 250 μm and less than or equal to 6 mm, greater than or equal to 250 μm and less than or equal to 5 mm, greater than or equal to 250 μm and less than or equal to 4 mm, greater than or equal to 250 μm and less than or equal to 3 mm, greater than or equal to 250 μm and less than or equal to 2 mm, greater than or equal to 500 μm and less than or equal to 6 mm, greater than or equal to 500 μm and less than or equal to 5 mm, greater than or equal to 500 μm and less than or equal to 4 mm, greater than or equal to 500 μm and less than or equal to 3 mm, greater than or equal to 500 μm and less than or equal to 2 mm, greater than or equal to 750 μm and less than or equal to 6 mm, greater than or equal to 750 μm and less than or equal to 5 mm, greater than or equal to 750 μm and less than or equal to 4 mm, greater than or equal to 750 μm and less than or equal to 3 mm, greater than or equal to 750 μm and less than or equal to 2 mm, greater than or equal to 1 mm and less than or equal to 6 mm, greater than or equal to 1 mm and less than or equal to 5 mm, greater than or equal to 1 mm and less than or equal to 4 mm, greater than or equal to 1 mm and less than or equal to 3 mm, or even greater than or equal to 1 mm and less than or equal to 2 mm, or any and all sub-ranges formed from any of these endpoints.

In embodiments, the glass compositions described herein have a relatively low softening point to enhance the formability of the glass composition and the quality of the final glass article formed from the glass composition. In embodiments, the glass composition may have a softening point greater than or equal to 700° C. or even greater than or equal to 750° C. In embodiments, the glass composition may have a softening point less than or equal to 860° C., less than or equal to 840° C., less than or equal to 820° C., or even less than or equal to 800° C. In embodiments, the glass composition may have a softening point greater than or equal to 700° C. and less than or equal to 860° C., greater than or equal to 700° C. and less than or equal to 840° C., greater than or equal to 700° C. and less than or equal to 820° C., greater than or equal to 700° C. and less than or equal to 800° C., greater than or equal to 750° C. and less than or equal to 860° C., greater than or equal to 750° C. and less than or equal to 840° C., greater than or equal to 750° C. and less than or equal to 820° C., or even greater than or equal to 750° C. and less than or equal to 800° C., or any and all sub-ranges formed from any of these endpoints. To obtain softening points within these ranges, and thereby improve the formability of the glass composition, the various constituent components should be selected and balanced relative to one another. Specifically, it has been found that the glass compositions which meet the relationship $Al_2O_3*(4.20)+B_2O_3*(-7.69)+P_2O_5*(-1.61)+Li_2O*(-9.66)+Na_2O*(-7.11)+K_2O*(-9.78)+MgO*(-4.03)+CaO*(-6.14)+SrO*(-2.41)$ is less than $-100$ may have softening points as specified herein.

In embodiments, the glass compositions described herein may have an annealing point greater than or equal to 300° C., greater than or equal to 400° C., or even greater than or equal to 500° C. In embodiments, the glass composition may have an annealing point less than or equal to 700° C. or even less than or equal to 600° C. In embodiments, the glass composition may have an annealing point greater than or equal to 300° C. and less than or equal to 700° C., greater than or equal to 300° C. and less than or equal to 600° C., greater than or equal to 400° C. and less than or equal to 700° C., greater than or equal to 400° C. and less than or equal to 600° C., greater than or equal to 500° C. and less than or equal to 700° C., or even greater than or equal to 500° C. and less than or equal to 600° C., or any and all sub-ranges formed from any of these endpoints.

In embodiments, the liquidus temperature of the glass composition may be adjusted to obtain the desired liquidus viscosity. A decreased liquidus temperature increases the liquidus viscosity of the glass composition, thereby increasing the formability of the glass composition. In embodiments, the liquidus temperature of the glass composition may be greater than or equal to 700° C., greater than or equal to 800° C., or even greater than or equal to 900° C. In embodiments, the liquidus temperature of the glass composition may be less than or equal to 1200° C. or even less than or equal to 1100° C. In embodiments, the liquidus temperature of the glass composition may be greater than or equal to 700° C. and less than or equal to 1200° C., greater than or equal to 700° C. and less than or equal to 1100° C., greater than or equal to 800° C. and less than or equal to 1200° C., greater than or equal to 800° C. and less than or equal to 1100° C., greater than or equal to 900° C. and less than or equal to 1200° C., or even greater than or equal to 900° C. and less than or equal to 1100° C., or any and all sub-ranges formed from any of these endpoints.

In embodiments, the glass composition may have a liquidus viscosity greater than or equal to 1 kP, greater than or equal to 5 kP, greater than or equal to 25 kP, greater than or equal to 50 kP, greater than or equal to 75 kP, or even greater than or equal to 90 kP. In embodiments, the glass composition may have a liquidus viscosity less than or equal to 300 kP, less than or equal to 250 kP, less than or equal to 200 kP, less than or equal to 150 kP, less than or equal to 100 kP, less than or equal to 75 kP, less than or equal to 50 kP, or even less than or equal to 25 kP. In embodiments, the glass composition may have a liquidus viscosity greater than or equal to 1 kP and less than or equal to 300 kP, greater than or equal to 1 kP and less than or equal to 250 kP, greater than or equal to 1 kP and less than or equal to 200 kP, greater than or equal to 1 kP and less than or equal to 150 kP, greater than or equal to 1 kP and less than or equal to 100 kP, greater than or equal to 1 kP and less than or equal to 75 kP, greater than or equal to 1 kP and less than or equal to 50 kP, greater than or equal to 1 kP and less than or equal to 25 kP, greater than or equal to 5 kP and less than or equal to 300 kP, greater than or equal to 5 kP and less than or equal to 250 kP, greater than or equal to 5 kP and less than or equal to 200 kP, greater than or equal to 5 kP and less than or equal to 150 kP, greater than or equal to 5 kP and less than or equal to 100 kP, greater than or equal to 5 kP and less than or equal to 75 kP, greater than or equal to 5 kP and less than or equal to 50 kP, greater than or equal to 5 kP and less than or equal to 25 kP, greater than or equal to 25 kP and less than or equal to 300 kP, greater than or equal to 25 kP and less than or equal to 250 kP, greater than or equal to 25 kP and less than or equal to 200 kP, greater than or equal to 25 kP and less than or equal to 150 kP, greater than or equal to 25 kP and less than or equal to 100 kP, greater than or equal to 25 kP and less than or equal to 75 kP, greater than or equal to 25 kP and less than or equal to 50 kP, greater than or equal to 50 kP and less than or equal to 300 kP, greater than or equal to 50 kP and less than or equal to 250 kP, greater than or equal to 50 kP and less than or equal to 200 kP, greater than or equal to 50 kP and less than or equal to 150 kP, greater than or equal to 50 kP and less than or equal to 100 kP, greater than or equal to 50 kP and less than or equal to 75 kP, greater than or equal to 75 kP and less than or equal to 300 kP, greater than or equal to 75 kP and less than or equal to 250 kP, greater than or equal to 75 kP and less than or equal to 200 kP, greater than or equal to 75 kP and less than or equal to 150 kP, greater than or equal to 75 kP and less than or equal to 100 kP, greater than or equal to 90 kP and less than or equal to 300 kP, greater than or equal to 90 kP and less than or equal to 250 kP, greater than or equal to 90 kP and less than or equal to 200 kP, greater than or equal to 90 kP and less than or equal to 150 kP, or even greater than or equal to 90 kP and less than or equal to 100 kP, or any and all sub-ranges formed from any of these endpoints. These ranges of viscosities allow the glass compositions to be formed into sheets by a variety of different techniques including, without limitation fusion forming, slot draw, floating, rolling, and other sheet-forming processes known to those in the art. However, it should be understood that other processes may be used for forming other articles (i.e., other than sheets).

In embodiments, the glass composition may have a Zircon dissociation viscosity greater than or equal to 15 kP or even greater than or equal to 20 kP. In embodiments, the glass composition may have a Zircon dissociation viscosity less than or equal to 40 kP, less than or equal to 35 kP, less than or equal to 30 kP, or even less than or equal to 27. In embodiments, the glass composition may have a Zircon dissociation viscosity greater than or equal to 15 kP and less than or equal to 40 kP, greater than or equal to 15 kP and less than or equal to 35 kP, greater than or equal to 15 kP and less than or equal to 30 kP, greater than or equal to 15 kP and less than or equal to 27 kP, greater than or equal to 20 kP and less than or equal to 40 kP, greater than or equal to 20 kP and less than or equal to 35 kP, greater than or equal to 20 kP and less than or equal to 30 kP, or even greater than or equal to 20 kP and less than or equal to 27 kP, or any and all sub-ranges formed from any of these endpoints. To obtain Zircon dissociation viscosities within these ranges, and thereby preserve the lifetime of refractory during manufacture of the glass composition, the various constituent components should be selected and balanced relative to one another. Specifically, it has been found that the glass compositions which meet the relationship $Al_2O_3*(-7.17)+B_2O_3*(6.89)+P_2O_5*(12.72)+Li_2O*(4.07)+Na_2O*(-3.47)+K_2O*(-4.01)+MgO*(2.50)+CaO*(3.55)+SrO*(-0.77)$ is greater than −100 may have Zircon dissociation viscosities as specified herein.

In embodiments, the glass composition may have a Zircon dissociation temperature greater than or equal to 950° C., greater than or equal to 1000° C., or even greater than or equal to 1050° C. In embodiments, the glass composition may have a Zircon dissociation temperature less than or equal to 1300° C., less than or equal 1250° C., or even less than or equal to 1200° C. In embodiments, the glass composition may have a Zircon dissociation temperature may be greater than or equal to 950° C. and less than or equal to 1300° C., greater than or equal to 950° C. and less than or equal to 1250° C., greater than or equal to 950° C. and less than or equal to 1200° C., greater than or equal to 1000° C. and less than or equal to 1300° C., greater than or equal to 1000° C. and less than or equal to 1250° C., greater than or equal to 1000° C. and less than or equal to 1200° C., greater than or equal to 1050° C. and less than or equal to 1300° C., greater than or equal to 1050° C. and less than or equal to 1250° C., greater than or equal to 1050° C. and less than or equal to 1200° C., or any and all sub-ranges formed from any of these endpoints.

In embodiments, the glass composition may have a fracture toughness greater than or equal to 0.7 MPa·m$^{1/2}$, greater than or equal to 0.8 MPa·m$^{1/2}$, greater than or equal to 0.9 MPa·m$^{1/2}$, or even greater than or equal to 1.0 MPa·m$^{1/2}$. To obtain fracture toughness within these ranges, and thereby improve the strength of the glass composition, the various constituent components should be selected and balanced relative to one another. Specifically, it has been found that glass compositions which meet the relationship $Al_2O_3*(26.051)+B_2O_3*(24.853)+P_2O_5*(-33.097)+Li_2O*(-7.539)+Na_2O*(-17.349)+K_2O*(-33.097)+MgO*(5.192)+CaO*(-10.867)+SrO*(-10.867)$ is greater than 100 may have fracture toughness as specified herein.

In embodiments, the glass compositions described herein are ion-exchangeable to facilitate strengthening the glass article made from the glass compositions. In typical ion exchange processes, smaller metal ions in the glass compositions are replaced or "exchanged" with larger metal ions of the same valence within a layer that is close to the outer surface of the glass article made from the glass composition. The replacement of smaller ions with larger ions creates a surface compressive stress within the layer of the glass article made from the glass composition. In embodiments, the metal ions are monovalent metal ions (e.g., Li$^+$, Na$^+$, K$^+$, and the like), and ion exchange is accomplished by immersing the glass article made from the glass composition in a bath comprising at least one molten salt of the larger metal ion that is to replace the smaller metal ion in the glass article. Alternatively, other monovalent ions such as Ag$^+$, Tl$^+$, Cu$^+$, and the like may be exchanged for monovalent ions. The ion exchange process or processes that are used to strengthen the glass article made from the glass composition may include, but are not limited to, immersion in a single bath or multiple baths of like or different compositions with washing and/or annealing steps between immersions.

The glass composition may be exposed to the ion exchange solution (e.g., $KNO_3$ and/or $NaNO_3$ molten salt bath) by dipping a glass article made from the glass composition into a bath of the ion exchange solution, spraying the ion exchange solution onto a glass article made from the glass composition, or otherwise physically applying the ion exchange solution to a glass article made from the glass composition. Upon exposure to the glass composition, the ion exchange solution may, according to embodiments, be at a temperature greater than or equal to 350° C. and less than or equal to 500° C., greater than or equal to 360° C. and less than or equal to 450° C., greater than or equal to 370° C. and less than or equal to 440° C., greater than or equal to 360° C. and less than or equal to 420° C., greater than or equal to 370° C. and less than or equal to 400° C., greater than or equal to 375° C. and less than or equal to 475° C., greater than or equal to 400° C. and less than or equal to 500° C., greater than or equal to 410° C. and less than or equal to 490° C., greater than or equal to 420° C. and less than or equal to 480° C., greater than or equal to 430° C. and less than or equal to 470° C., or even greater than or equal to 440° C. and less than or equal to 460° C., or any and all sub-ranges formed between these endpoints. In embodiments, the glass composition may be exposed to the ion exchange solution for a duration greater than or equal to 2 hours and less than or equal to 48 hours, greater than or equal to 2 hours and less than or equal to 24 hours, greater than or equal to 2 hours and less than or equal to 12 hours, greater than or equal to 2 hours and less than or equal to 6 hours, greater than or equal to 8 hours and less than or equal to 44 hours, greater than or equal to 12 hours and less than or equal to 40 hours, greater than or equal to 16 hours and less than or equal to 36 hours, greater than or equal to 20 hours and less than or equal to 32 hours, or even greater than or equal to 24 hours and less than or equal to 28 hours, or any and all sub-ranges formed between any of these endpoints.

In embodiments, the glass articles made from the glass compositions may be ion exchanged to achieve a depth of compression greater than or equal to 4.5 µm, greater than or equal to 6 µm, greater than or equal to 8 µm, greater than or equal to 10 µm, greater than or equal to 12 µm, or even greater than or equal to 15 µm. The development of this surface compression layer is beneficial for achieving a better crack resistance and higher flexural strength compared to non-ion-exchanged materials. The surface compression layer has a higher concentration of the ions exchanged into the glass article in comparison to the concentration of the ions exchanged into the glass article for the body (i.e., the area not including the surface compression) of the glass article.

In embodiments, the glass composition may have a surface compressive stress greater than or equal to 1100 MPa, greater than or equal to 1150 MPa, or even greater than or equal to 1200 MPa. In embodiments, the glass composition may have a surface compressive stress less than or equal to 1700 MPa, less than or equal to 1600 MPa, or even less than or equal to 1500 MPa. In embodiments, the glass composition may have a surface compressive stress greater than or equal to 1100 MPa and less than or equal to 1700 MPa, greater than or equal to 1100 MPa and less than or equal to 1600 MPa, greater than or equal to 1100 MPa and less than or equal to 1500 MPa, greater than or equal to 1150 MPa and less than or equal to 1700 MPa, greater than or equal to 1150 MPa and less than or equal to 1600 MPa, greater than or equal to 1150 MPa and less than or equal to 1500 MPa, greater than or equal to 1200 MPa and less than or equal to 1700 MPa, greater than or equal to 1200 MPa and less than or equal to 1600 MPa, or even greater than or equal to 1200 MPa and less than or equal to 1500 MPa, or any and all sub-ranges formed between any of these endpoints. To obtain surface compressive stresses within these ranges, and thereby improve the strength of the glass composition, the various constituent components should be selected and balanced relative to one another. Specifically, it has been found that glass compositions which meet the relationship $Al_2O_3*(2.94)+B_2O_3*(-0.58)+P_2O_5*(-3.87)+Li_2O*(5.01)+Na_2O*(1.89)+K_2O*(-2.03)$ is greater than 100 may have surface compressive stresses as specified herein.

In embodiments, the glass composition may have a surface compressive stress greater than or equal to 1100 MPa and a depth of compression greater than or equal to 4.5 µm. In embodiments, the glass composition may have a surface compressive stress greater than or equal to 1100 MPa, greater than or equal to 1150 MPa, or even greater than or equal to 1200 MPa, and a depth of compression greater than or equal to 4.5 µm, greater than or equal to 6 µm, greater than or equal to 8 µm, greater than or equal to 10 µm, greater than or equal to 12 µm, or even greater than or equal to 15 µm.

After an ion exchange process is performed, it should be understood that a composition at the surface of a glass article may be different than the composition of the as-formed glass article (i.e., the glass article before it undergoes an ion exchange process). This results from one type of alkali metal ion in the as-formed glass, such as, for example $Li^+$ or $Na^+$, being replaced with larger alkali metal ions, such as, for example $Na^+$ or $K^+$, respectively. However, the glass composition at or near the center of the depth of the glass article will, in embodiments, still have the composition of the as-formed (non-ion exchanged) glass utilized to form the glass article.

The glass compositions described herein may be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications. In embodiments, a consumer electronic device (e.g., smartphones, tablet computers, personal computers, ultrabooks, televisions, and cameras), an architectural glass, and/or an automotive glass may comprise a glass article as described herein. An exemplary article incorporating any of the glass compositions disclosed herein may be a consumer electronic device including a housing; electrical components that are at least partially inside or entirely within the housing and including at least a controller, a memory, and a display at or adjacent to the front surface of the housing; and a cover substrate at or over the front surface of the housing such that it is over the display. In some embodiments, at least a portion of at least one of the cover substrate and/or the housing may include any of the glass compositions disclosed herein.

EXAMPLES

In order that various embodiments be more readily understood, reference is made to the following examples, which are intended to illustrate various embodiments of the glass compositions described herein.

Table 1 shows comparative example glass compositions (in terms of mol %). Glasses were formed having the comparative glass compositions C1-C4.

TABLE 1

| Example | C1 | C2 | C3 | C4 |
|---|---|---|---|---|
| $SiO_2$ | 63.68 | 63.70 | 58.66 | 63.60 |
| $Al_2O_3$ | 15.68 | 16.18 | 17.85 | 15.07 |
| $B_2O_3$ | 0 | 0.39 | 4.22 | 2.40 |
| $P_2O_5$ | 2.48 | 2.64 | 1.47 | 2.51 |
| $Li_2O$ | 6.22 | 8.04 | 7.67 | 5.93 |
| $Na_2O$ | 10.73 | 8.10 | 8.72 | 9.26 |
| $K_2O$ | 0 | 0.53 | 0.07 | 0 |
| MgO | 0 | 0.33 | 1.19 | 0 |
| CaO | 0 | 0 | 0 | 0 |
| SrO | 0 | 0 | 0 | 0 |
| ZnO | 1.16 | 0 | 0 | 1.18 |
| $TiO_2$ | 0 | 0.01 | 0.10 | 0 |
| $SnO_2$ | 0.04 | 0.05 | 0.04 | 0.06 |
| $R_2O$ | 17.0 | 16.7 | 16.5 | 15.2 |
| RO | 1.2 | 0.3 | 1.2 | 1.2 |
| $R_2O$ + RO | 18.2 | 17.0 | 17.7 | 16.4 |
| $R_2O$ + RO − $Al_2O_3$ | 2.5 | 0.8 | −0.2 | 1.3 |

TABLE 1-continued

| Example | C1 | C2 | C3 | C4 |
|---|---|---|---|---|
| $Al_2O_3$*(2.94) + $B_2O_3$*(−0.58) + $P_2O_5$*(−3.87) + $Li_2O$*(5.01) + $Na_2O$*(1.89) + $K_2O$*(−2.03) | 87.9 | 91.6 | 99.1 | 80.4 |
| $Al_2O_3$*(4.20) + $B_2O_3$*(−7.69) + $P_2O_5$*(−1.61) + $Li_2O$*(−9.66) + $Na_2O$*(−7.11) + $K_2O$*(−9.78) + MgO*(−4.03) + CaO*(−6.14) + SrO*(−2.41) | −74.5 | −81.1 | −101.4 | −82.3 |
| $Al_2O_3$*(−7.17) + $B_2O_3$*(6.89) + $P_2O_5$*(12.72) + $Li_2O$*(4.07) + $Na_2O$*(−3.47) + $K_2O$*(−4.01) + MgO*(2.50) + CaO*(3.55) + SrO* (−0.77) | −92.8 | −76.4 | −76.6 | −67.6 |
| $Al_2O_3$*(26.051) + $B_2O_3$*(24.853) + $P_2O_5$*(−33.097) + $Li_2O$*(−7.539) + $Na_2O$*(−17.349) + $K_2O$*(−33.097) + MgO*(5.192) + CaO*(−10.867) + SrO*(−10.867) | 93.4 | 126.9 | 316.0 | 163.8 |

Table 2 shows example glass compositions (in terms of mol %) and the respective properties of the glass compositions. Glasses were formed having the example glass compositions 1-6.

TABLE 2

| | Example | | | | | |
|---|---|---|---|---|---|---|
| | 1 | 2 | 3 | 4 | 5 | 6 |
| $SiO_2$ | 58.1 | 59.8 | 58.1 | 57.8 | 58.1 | 58.0 |
| $Al_2O_3$ | 16.0 | 16.3 | 15.9 | 16.4 | 17.0 | 17.6 |
| $B_2O_3$ | 0.0 | 0.0 | 3.3 | 3.3 | 3.2 | 3.0 |
| $P_2O_5$ | 2.0 | 2.0 | 0.3 | 0.8 | 1.3 | 1.8 |
| $Li_2O$ | 7.9 | 8.1 | 7.1 | 7.5 | 7.7 | 8.0 |
| $Na_2O$ | 11.8 | 10.7 | 11.7 | 11.4 | 10.8 | 10.4 |
| $K_2O$ | 0.0 | 0.0 | 0.0 | 0.0 | 0.0 | 0.0 |
| MgO | 3.9 | 2.9 | 3.3 | 2.6 | 1.8 | 1.0 |
| CaO | 0.0 | 0.0 | 0.0 | 0.0 | 0.0 | 0.0 |
| SrO | 0.0 | 0.0 | 0.0 | 0.0 | 0.0 | 0.0 |
| $R_2O$ | 19.7 | 18.8 | 18.8 | 18.9 | 18.5 | 18.4 |
| RO | 3.9 | 2.9 | 3.3 | 2.6 | 1.8 | 1.0 |
| $R_2O$ + RO | 23.6 | 21.7 | 22.1 | 21.5 | 20.3 | 19.4 |
| $R_2O$ + RO − $Al_2O_3$ | 7.6 | 5.4 | 6.2 | 5.1 | 3.3 | 1.8 |
| $Al_2O_3$ * (2.94) + $B_2O_3$ * (−0.58) + $P_2O_5$ * (−3.87) + $Li_2O$ * (5.01) + $Na_2O$ * (1.89) + $K_2O$ * (−2.03) | 101.2 | 101.0 | 101.4 | 102.3 | 102.1 | 102.8 |
| $Al_2O_3$ * (4.20) + $B_2O_3$ * (−7.69) + $P_2O_5$ * (−1.61) + $Li_2O$ * (−9.66) + $Na_2O$ * (−7.11) + $K_2O$ * (−9.78) + MgO * (−4.03) + CaO * (−6.14) + SrO * (−2.41) | −111.9 | −100.8 | −124.2 | −121.8 | −113.7 | −107.3 |
| $Al_2O_3$ * (−7.17) + $B_2O_3$ * (6.89) + $P_2O_5$ * (12.72) + $Li_2O$ * (4.07) + $Na_2O$ * (−3.47) + $K_2O$ * (−4.01) + MgO * (2.50) + CaO * (3.55) + SrO * (−0.77) | −88.3 | −88.3 | −90.9 | −87.2 | −84.9 | −83.7 |
| $Al_2O_3$ * (26.051) + $B_2O_3$ * (24.853) + $P_2O_5$ * (−33.097) + $Li_2O$ * (−7.539) + $Na_2O$ * (−17.349) + $K_2O$ * (−33.097) + MgO * (5.192) + CaO * (−10.867) + SrO * (−10.867) | 106.6 | 126.8 | 246.9 | 242.0 | 243.3 | 237.9 |
| Liquidus temperature (° C.) | 980 | 1025 | 945 | 940 | 985 | 1015 |
| Liquidus viscosity (kP) | 201 | 176 | 165 | 272 | 218 | 152 |
| Zircon dissociation temperature (° C.) | 1065 | 1108 | 1035 | 1057 | 1085 | 1105 |
| Zircon dissociation viscosity (kP) | 32 | 33 | 32 | 29 | 30 | 30 |
| Annealing Pt. (° C.) | 620 | 629.5 | 540.9 | 554.9 | 577.3 | 579.2 |
| Softening Pt. (° C.) | 840 | 864 | 754 | 770 | 800 | 801 |

Table 3 shows the surface compressive stress and depth of compressive stress of example glass compositions 1-6 after applying an ion exchange solution to 0.8 mm glass articles made from example glass compositions 1-6 at 370° C. for 4 hours, 8 hours, and 16 hours. The ion exchange solution applied to the glass articles made from example glass compositions 1-6 was 100% KNO$_3$.

TABLE 3

| | Example | | | | | |
|---|---|---|---|---|---|---|
| | 1 | 2 | 3 | 4 | 5 | 6 |
| IOX Condition | 370° C., 100% KNO3 | | | | | |
| | 4 hours | | | | | |
| CS (MPa) | 1377 | 1364 | 1339 | 1286 | 1287 | 1264 |
| DOC (μm) | 8.6 | 9.1 | 4.9 | 6.2 | 7.3 | 7.5 |
| | 8 hours | | | | | |
| CS (MPa) | 1343 | 1330 | 1268 | 1250 | 1244 | 1228 |
| DOC (μm) | 12.4 | 12.8 | 7 | 8.6 | 10.4 | 10.8 |
| | 16 hours | | | | | |
| CS (MPa) | 1314 | 1301 | 1214 | 1193 | 1192 | 1180 |
| DOC (μm) | 17.5 | 18 | 9.9 | 12.1 | 15 | 15.4 |

Figure 1:
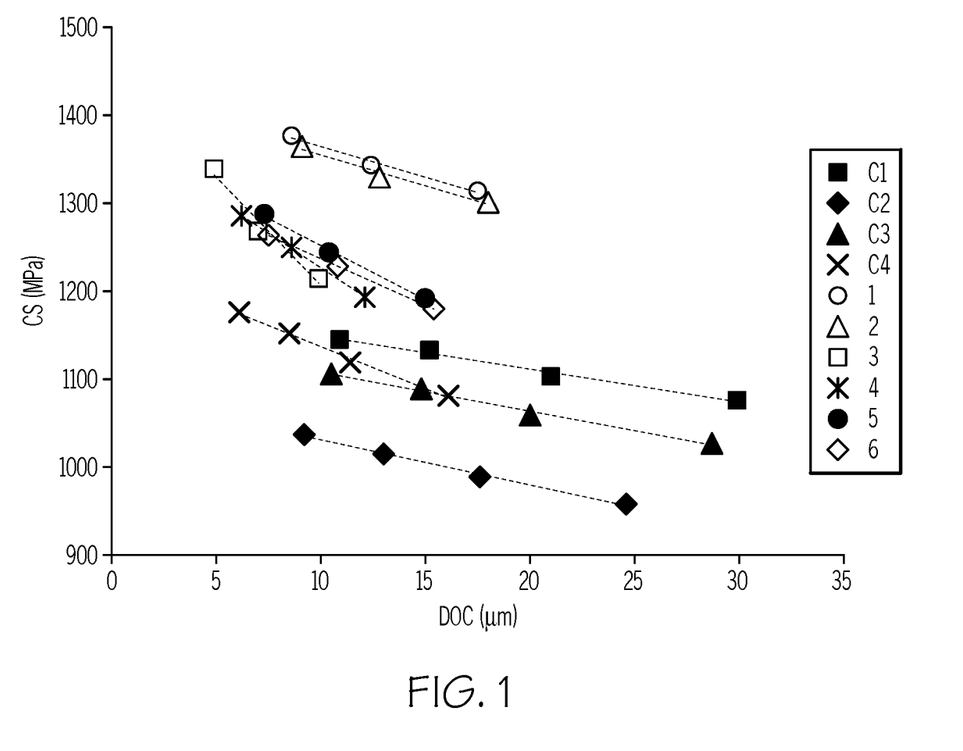
FIG. 1 is a plot of surface compressive stress versus depth of compression of glass articles made from comparative glass compositions and exemplary glass compositions according to one or more embodiments described herein.

Referring now to FIG. 1, example glass compositions 1-6 achieved higher surface compressive stress values at lower depths of compression than comparative example glass compositions C1-C4.

Figure 2:
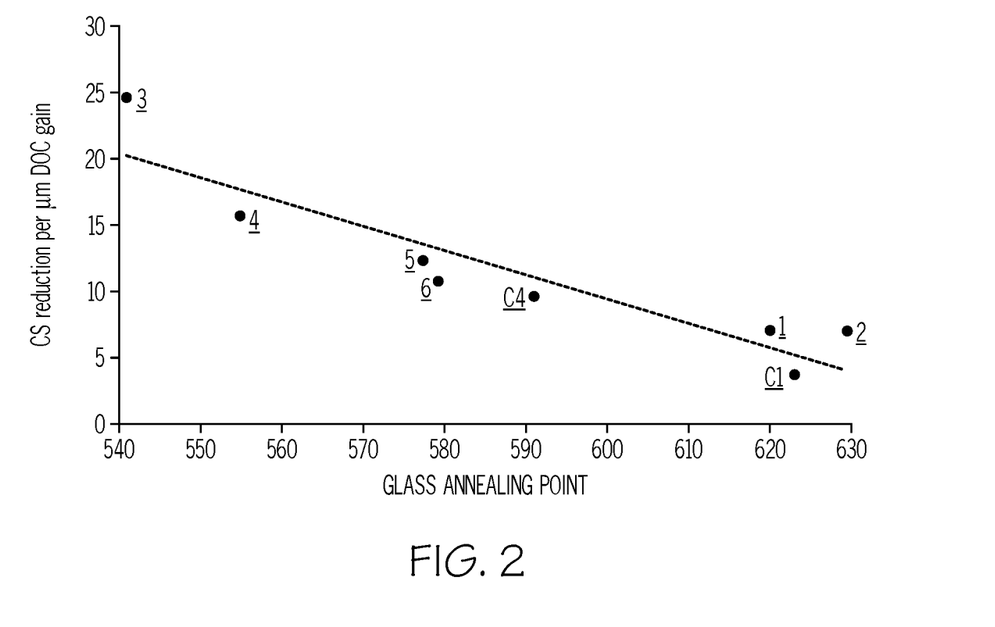
FIG. 2 is a plot of surface compressive stress reduction per μm of depth of compression gain for articles made from comparative glass compositions and exemplary glass compositions according to one or more embodiments described herein.

Referring now to FIG. 2, as the glass composition annealing point decreases, the loss of surface compressive stress per μm of depth of compression gained significantly increases. Accordingly, it is desirable that the glass composition have an increased annealing point such that the surface compressive stress is maintained as the depth of compression increases.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass composition comprising:
   greater than or equal to 55 mol % and less than or equal to 70 mol % SiO$_2$;
   greater than or equal to 14 mol % and less than or equal to 25 mol % Al$_2$O$_3$;
   greater than or equal to 0 mol % B$_2$O$_3$;
   greater than or equal to 0 mol % P$_2$O$_5$;
   greater than or equal to 0 mol % and less than or equal to 10 mol % Li$_2$O;
   greater than or equal to 6.5 mol % and less than or equal to 20 mol % Na$_2$O;
   greater than or equal to 0 mol % K$_2$O;
   greater than or equal to 0.1 mol % and less than or equal to 4.5 mol % MgO;
   greater than or equal to 0 mol % CaO; and
   greater than or equal to 0 mol % SrO, wherein:
   Li$_2$O+Na$_2$O+K$_2$O is greater than or equal to 6.5 mol % and less than or equal to 22 mol %;
   Al$_2$O$_3$*(2.94)+B$_2$O$_3$*(−0.58)+P$_2$O$_5$*(−3.87)+Li$_2$O*(5.01)+Na$_2$O*(1.89)+K$_2$O*(−2.03) is greater than 100;
   Al$_2$O$_3$*(4.20)+B$_2$O$_3$*(−7.69)+P$_2$O$_5$*(−1.61)+Li$_2$O*(−9.66)+Na$_2$O*(−7.11)+K$_2$O*(−9.78)+MgO*(−4.03)+CaO*(−6.14)+SrO*(−2.41) is less than or equal to −107.3; and
   the glass composition has a softening point greater than or equal to 700° C. and less than or equal to 840° C.

2. The glass composition of claim 1, wherein Al$_2$O$_3$*(−7.17)+B$_2$O$_3$*(6.89)+P$_2$O$_5$*(12.72)+Li$_2$O*(4.07)+Na$_2$O*(−3.47)+K$_2$O*(−4.01)+MgO*(2.50)+CaO*(3.55)+SrO*(−0.77) is greater than −100.

3. The glass composition of claim 1, wherein Al$_2$O$_3$*(26.051)+B$_2$O$_3$*(24.853)+P$_2$O$_5$*(−33.097)+Li$_2$O*(−7.539)+Na$_2$O*(−17.349)+K$_2$O*(−33.097)+MgO*(5.192)+CaO*(−10.867)+SrO*(−10.867) is greater than 100.

4. The glass composition of claim 1, wherein Li$_2$O+Na$_2$O+K$_2$O is greater than or equal to 6.5 mol % and less than or equal to 20 mol %.

5. The glass composition of claim 1, wherein the glass composition comprises greater than or equal to 14 mol % and less than or equal to 20 mol % Al$_2$O$_3$.

6. The glass composition of claim 1, wherein the glass composition comprises greater than or equal to 0.5 mol % and less than or equal 4 mol % MgO.

7. The glass composition of claim 1, wherein the glass composition comprises greater than or equal to 3 mol % and less than or equal to 10 mol % Li$_2$O.

8. The glass composition of claim 1, wherein the glass composition comprises greater than or equal to 6.5 mol % and less than or equal to 15 mol % Na$_2$O.

9. The glass composition of claim 1, wherein the glass composition comprises greater than or equal to 0 mol % and less than or equal to 5 mol % B$_2$O$_3$.

10. The glass composition of claim 1, wherein the glass composition comprises greater than or equal to 0 mol % and less than or equal to 5 mol % P$_2$O$_5$.

11. The glass composition of claim 1, wherein the glass composition comprises greater than or equal to 56 mol % and less than or equal to 67 mol % SiO$_2$.

12. The glass composition of claim 1, wherein the glass composition has a softening point greater than or equal to 750° C. and less than or equal to 820° C.

13. The glass composition of claim 1, wherein the glass composition is chemically strengthened and has a surface compressive stress greater than or equal to 1100 MPa.

14. The glass composition of claim 13, wherein the glass composition is chemically strengthened in an ion exchange bath comprising KNO$_3$ at a temperature greater than or equal to 350° C. and less than or equal to 500° C. for a time period greater than or equal to 2 hours and less than or equal to 12 hours.

15. The glass composition of claim 13, wherein the strengthened glass has a surface compressive stress greater than or equal to 1150 MPa.

16. The glass composition of claim 13, wherein the strengthened glass has a depth of compression of greater than or equal to 4.5 μm.

17. The glass composition of claim 16, wherein the strengthened glass has a depth of compression greater than or equal to 6 μm.

18. The glass composition of claim 13, wherein the strengthened glass has a compressive stress greater than or equal to 1100 MPa and a depth of compression greater than or equal to 4.5 μm.

* * * * *